United States Patent
Cochran et al.

(10) Patent No.: US 7,032,056 B2
(45) Date of Patent: Apr. 18, 2006

(54) ENCODING OF MESSAGE ONTO STROBE SIGNALS

(75) Inventors: William Hugh Cochran, Rochester, MN (US); William Paul Hovis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/431,928

(22) Filed: May 8, 2003

(65) Prior Publication Data

US 2004/0243907 A1 Dec. 2, 2004

(51) Int. Cl.
*H03M 13/00* (2006.01)
*G06F 11/00* (2006.01)
*G06F 13/38* (2006.01)

(52) U.S. Cl. .............. 710/305; 714/759; 370/912; 710/106

(58) Field of Classification Search .............. 710/100, 710/106, 305, 18, 32, 73; 714/759, 40–49, 714/799, 25, 712, 754; 709/200, 224; 365/189.05, 365/233.5; 326/62; 370/451, 912; 361/683–686, 361/679; 712/33, 32; 341/50; 713/340
See application file for complete search history.

(56) References Cited

U.S. PATENT DOCUMENTS

| | | | | | |
|---|---|---|---|---|---|
| 4,485,470 | A | * | 11/1984 | Reali | 370/537 |
| 4,839,890 | A | * | 6/1989 | Semerau et al. | 370/503 |
| 4,866,598 | A | * | 9/1989 | Sonnek et al. | 710/45 |
| 5,729,502 | A | * | 3/1998 | Furutani et al. | 365/233 |
| 5,907,509 | A | * | 5/1999 | Furutani et al. | 365/189.05 |
| 6,101,567 | A | * | 8/2000 | Kim et al. | 710/305 |
| 6,195,768 | B1 | * | 2/2001 | Green | 714/47 |
| 2004/0243907 | A1 | * | 12/2004 | Cochran et al. | 714/759 |

OTHER PUBLICATIONS

"Pipeline design based on self-resetting stage logic" by Ejnioui et al. (abstract only) Publication Date: Feb. 19-20, 2004.*

* cited by examiner

*Primary Examiner*—Gopal C. Ray
(74) *Attorney, Agent, or Firm*—Robert R. Williams

(57) ABSTRACT

Methods and apparatus are disclosed for use in an electronic system where data is transmitted over signaling conductors from one electronic component to another using strobe signals accompanying the data. The edge or transition of the strobe signals identifies when, in a window of time, the receiving electronic component should latch the data. In many such systems, data is transmitted over the signaling conductors in the form of a plurality "beats", of data, proper timing to latch each beat of data being identified by a transition of the strobe signal. Faults in components or errors in transmission must be handled. The present invention discloses apparatus and methods to communicate conditions relevant to data transmitted without requiring additional signaling conductors. The present invention discloses selecting a message from a plurality of messages, encoding the selected message, and transmitting the encoded message on existing strobe lines to communicate the condition encountered.

25 Claims, 9 Drawing Sheets

ENCODING OF MESSAGE ONTO STROBE SIGNALS

BACKGROUND OF THE INVENTION

1. Field of the Invention

The present invention generally relates to electronic signaling. More particularly, the present invention relates to data transmission from a first component to a second component over a signaling bus, the data transmission accompanied by one or more strobe signals normally used by the second component for the purpose of latching data received on the signaling bus.

2. Description of the Related Art

Historically, the density of circuits on silicon chips has increased exponentially and is forecasted to continue to do so for some time. "Moore's Law", an observation by Gordon Moore, co-founder of Intel Corporation, projects that the number of transistors per square inch of silicon doubles every 18 months. Although cost of processing silicon wafers has also increased to some degree, the overwhelming density of the circuitry has dramatically reduced the cost of many electronic products, such as computers, Personal Digital Assistants (PDAs), communication devices, and the like.

In contrast to on-chip circuitry, packaging interconnections used to drive signals from a chip or to receive signals onto a chip are relatively expensive, and the number of such interconnections has not increased greatly over time. Such interconnections are called pins. In "low-cost" chip packaging, pins cost approximately 0.5 cents per pin. In "high-performance" chip packaging, used for many ASICs (Application Specific Integrated Circuits) and processors, pins cost approximately 2.0 cents per pin. Pins in memory products cost approximately 1.0 cent per pin.

As a result, many techniques have been used to reduce the number of pins required. For example, DRAMs (Dynamic Random Access Memories) have for year's time multiplexed address lines. A Row Address is transmitted by a chip such as a processor over a group of signal conductors called an address bus and is strobed into a DRAM chip by a RAS (Row Address Strobe) signal. Subsequently, a Column Address is transmitted over the same address bus and is strobed into the DRAM chip by a CAS (Column Address Strobe) signal. Use of the same signal conductors for the row address and the column address dramatically reduces the number of pins required by the DRAM chip, as well as the processor.

Although "chip" is used for simplicity in the remaining discussion, those skilled in the art will recognize that the teachings of this invention apply to interconnections at any level of packaging, including, but not limited to, multi-chip modules, printed wiring boards (PWBs), and computer enclosures. The invention applies to any electrical component coupled to another electrical component coupled by a signaling bus accompanied by one or more strobe signals.

Because signal pins need to be kept to a low number, time multiplexing data over busses is a common technique. For example, a 32-byte bus is commonly used to interconnect one chip to another. The first chip may be a processor chip; the second may be another processor chip, a chip that communicates with a memory subsystem, or an I/O (Input/Output) subsystem. Commonly, blocks of data larger than the bus width need to be transferred. For example, a 128-byte block of data would require four bus cycles, or "beats", on the 32-byte bus for transmission. A bus cycle is the time period allocated for placing data the signal conductors of a bus and transmitting it before additional data is placed on the bus. Note that in many modern systems, another transmission begins before the previous transmission has physically reached the receiving chip. In the example, 32 bytes are transferred on a first bus cycle; 32 bytes more are transferred on a second bus cycle; 32 bytes more are transferred on a third bus cycle; and the final 32 bytes are transferred on a fourth bus cycle. Data in each bus cycle must arrive at the receiving chip within a known window of time. Such busses typically have strobe signals sent with the data to assist the receiver in determining when in the window of time the data from a particular bus cycle of data should be latched. Some busses are embodied with a single strobe for the entire bus. Some busses are embodied with a separate strobe for each byte of the bus.

The possibility of errors or malfunction on a chip or data transmission must be planned for by those designing the chip and the system in which the chip is used. Often, separate, expensive, additional busses are implemented to communicate status, errors, and diagnostics. In chips where cost is of utmost importance, and pins are kept at an absolute minimum, transmission of status, errors, and diagnostics is limited to "hard fails", either by incorrect data being sent, or an extra (and costly) signal pin being driven to a logic level that indicates an error has occurred, with no further diagnostics being transmitted on the extra signal wire. When such an event occurs, the system utilizing the chips may be forced into a shutdown or a complex diagnostic sequence, perhaps involving scanning of chip diagnostic through LSSD (Level Sensitive Scan Design) pins.

Therefore, a need exists to transmit timely error, status, or diagnostic information without the use of additional signal conductors.

SUMMARY OF THE INVENTION

The present invention generally provides methods and apparatus to transmit diagnostic, error, or status messages over one or more strobe signal conductors associated with a signaling, or data bus. The signaling bus is used to transfer a block of data that is larger than the signaling bus width, with multiple bus cycles used to transfer the block of data over the signaling bus.

In an embodiment, a method is disclosed, where, if there is no diagnostic, error, or status message to report, one or more strobe edges are transmitted in an expected encoded message by a driving chip and received by the receiving chip, identifying the proper times in expected timing windows to latch the incoming data. When there is a diagnostic, error, or status message to report, the diagnostic, error, or status message is encoded into an encoded message pattern, and transmitted on the one or more strobe conductors, causing the one or more strobe edge to differ from the expected pattern. The receiving chip then decodes the encoded message to determine the diagnostic, error, or status message sent.

In an embodiment, apparatus is disclosed that encodes a message pattern that is transmitted, by a sending chip, on one or more strobe signal conductors. The encoded message pattern differs from an expected encoded message pattern, in which transitions on the one or more strobe signal conductors are used on a receiving chip to cause data on a data bus to be latched.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3A shows a block diagram of a unidirectional, double data rate (DDR) data bus, with an accompanying strobe that is a differential signal, coupling a first chip and a second chip.

DETAILED DESCRIPTION OF THE PREFERRED EMBODIMENTS

The present invention provides methods and apparatus to send encoded messages via one or more strobe signal conductors relevant to data transmitted on an associated signaling bus. The strobe signal transitions sent on the one or more strobe signal conductors normally provide a receiving chip with timing information regarding when, within a window of time, data on the signaling bus should be latched.

Having reference now to the figures, and having provided above a discussion of the art, the present invention will be described in detail.

Figure 1A:
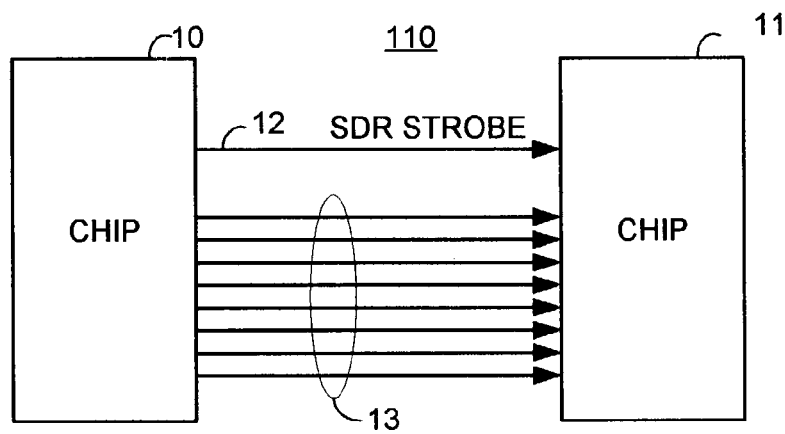
FIG. 1A shows a block diagram of a unidirectional, single data rate (SDR) data bus and an accompanying strobe coupling a first chip and a second chip.

FIG. 1A shows an electronic system generally referenced as 110 comprising a first chip 10 coupled to a second chip 11 via a signaling bus 13 and an SDR strobe 12. Chip 10 and chip 11 may be similar chips (e.g., one processor chip communicating with another processor chip). Chip 10 and chip 11 may be different chips (e.g., a processor chip and a memory chip). As stated earlier, although "chip" is used for exemplary purposes, the teachings of this invention apply equally to any level of interconnection between one electronic component and another.

Signaling bus 13 is any conductor of signals, including, but not limited to, electrically conducting wiring on a printed wiring board (PWB), electrically conducting cable conductors, electrically conducting wiring on a multi-chip module (MCM), or optically conducting signal fibers. Typically, signaling bus 13 comprises a number of signal conductors, and signaling bus 13 can simultaneously carry, for example, 8 bits, 16 bits, 32 bits, 64 bits of data, depending on how many signal conductors are in signaling bus 13. Similarly, SDR strobe 12 is likewise one or more conductor of signals. Typically, a block of data having more bits than can be transmitted over signaling bus 13 at one time needs to be sent. For example, a 128-byte block of data would require four bus cycles if signaling bus 13 has 32 bytes in an embodiment of signaling bus 13. Thirty-two bytes of data in such an example would be transmitted during each of four bus cycles, also called "beats". Data from each beat is expected within a window of time on chip 11. A voltage transition on SDR strobe 12 defines the proper time for chip 11 to latch data received from signaling bus 13. "SDR" in electronic system 110 means "single data rate". When data is sent at a single data rate, data from signaling bus 13 is latched only on single transition directions on SDR strobe 12, for example, data is only latched when the signal on SDR strobe 12 transitions from a low logic level to a high logic level. Signaling bus 13 and SDR strobe 12 are shown to be unidirectional busses in FIG. 1A, that is, chip 10 drives information that is received by chip 11. Even though the bus is "unidirectional", bi-directional I/O (input/output) circuitry on both chip 10 and chip 11 having both a driver and a receiver is often used, typically for test purposes. For example, during a bring-up test, chip 10 may cause its I/O circuits for signaling bus 13 and SDR Strobe 12 to go to a high impedance state and activate its receivers; chip 11 would then activate its I/O circuits as drivers. Chip 11 drives one or more known data patterns and chip 10 would verify that the known data patterns are received.

Figure 1B:
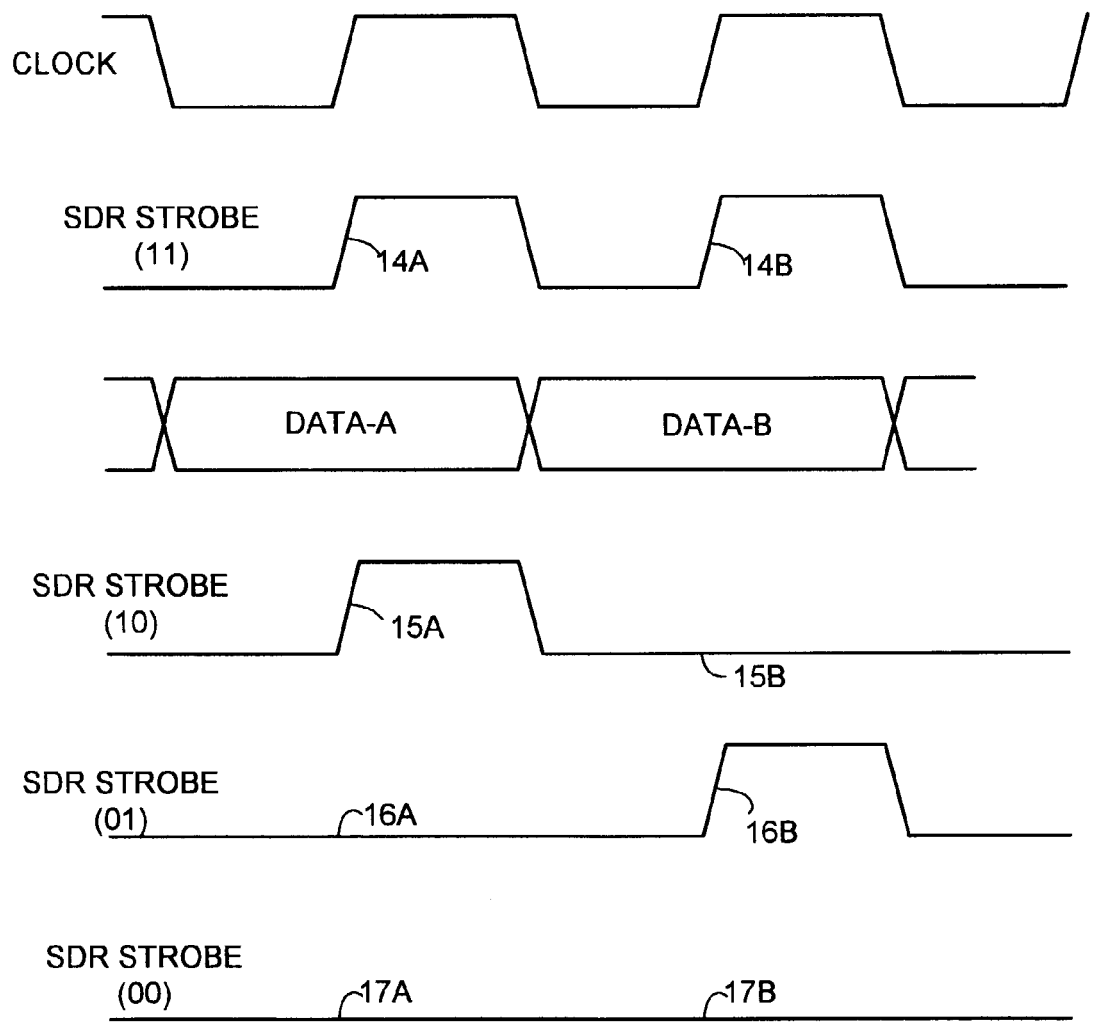
FIG. 1B shows representative waveforms on signals associated with the block diagram of FIG. 1A.

FIG. 1B shows exemplary waveforms that appear on signaling bus 13 and SDR strobe 12. An exemplary clock is also shown in FIG. 1B. Chip 10 has one or more internal clocks that cause processing to happen in an orderly manner as are understood by those skilled in the art. Chip 11 also has one or more internal clocks. Chip 10 sends data on signaling bus 13 and strobe transitions on SDR strobe 12 based upon the internal clocking of chip 10. Although chip 11 also has one or more internal clocks, those clocks may not be in perfect phase alignment with the one or more internal clocks of chip 10. Whereas chip 11 knows a window of time in which to expect data to arrive on signaling bus 13, chip 11 relies on transitions on SDR strobe 12 to latch data in latches or registers on chip 11. The clock waveform is included for explanatory reasons only, and may or may not be in perfect phase alignment with data or strobe signals. The clock signal only shows an exemplary clock waveform such as may appear on chip 10 or chip 11. Data-A and Data-B are two beats of data on signaling bus 13. Any particular signal conductor in signaling bus 13 may be at a high logic level or a low logic level, except during transitions from a low logic level to a high logic level, or from a high logic level to a low logic level. The openings wherein "Data-A" and "Data-B" are placed in the figure show stable logic levels. Those skilled in the art understand that sampling (latching) data at or near the center of these openings, rather than at or near the ends of the openings provides a lower rate of data transmission errors, or, in many cases, error-free operation. SDR strobe 12 as shown, has a transition at the receiver 14A at or near the center of the opening, or window, where Data-A appears at the receiver. Chip 11 uses this transition to latch Data-A from signaling bus 13. Similarly, transition 14B is used to latch Data-B.

Chip 10, may have detected an error in the data, or may have other critical information to convey to chip 11. For example, chip 10 may be an SRAM chip (static random access memory) that has determined that the data being sent is corrupt, perhaps having more errors than ECC (Error Correcting Code) circuitry can correct. Chip 10 may be detecting thermal problems to the degree that validity of data being transferred is in doubt, even though parity or ECC does not show a problem. If chip 10 is an SRAM chip, an address transmitted by chip 11 to chip 10 over an address bus (not shown) may have been found to be corrupted or otherwise unusable.

In the following examples a particular pattern on a strobe line, as identified in FIGS. 1B, 2B, 3B, 3C, 4B, and 5B, is identified in parentheses. For example, in FIG. 1B, SDR strobe (11) means that an encoded message "11" is transmitted on the exemplary strobe line, SDR strobe 12 in the example of FIG. 1.

The normal data transmission of electronic system 110 occurs when SDR strobe 12 rises at or near the center of the expected data windows, as explained above, and can be considered to be an encoded message "11" (i.e., two transitions, consisting of transition 14A and transition 14B). Encoded message "11" is shown as SDR strobe (11) in FIG. 1B. The present invention encodes another message and transmits that encoded message on SDR strobe 12 if such alternate message is determined to be necessary. In FIG. 1B, encoded message SDR Strobe (10) has transition 15A at the same timing position as transition 14A discussed earlier, but lacks a transition 15B in the expected data window. Chip 11 notes the lack of the second transition and recognizes that encoded message "10" has been sent. Similarly, encoded messages SDR Strobe (01) and SDR Strobe (00) can be sent, each recognized by chip 11 as abnormal conditions. Chip 11 takes appropriate predetermined action based upon the message received. A response of "00" (no transitions), as shown in example SDR Strobe (00) often means that chip 10 is "dead" and unable to respond at all, so encodings of messages having less serious meaning should have a value other than "00". Table 1 shows exemplary messages sent by chip 10 and predetermined actions taken by chip 11 responsive to each message. In general, a message could be any string of bits that represent a condition. In an embodiment, encoded messages are identical to the associated messages; however that is not a requirement of the present invention. For example, many systems use a bit for each condition possible, wherein one and only one condition can occur at a particular time. For example, in an embodiment, "1000" encodes to "00"; "0100" encodes to "01"; "0010" encodes to "10"; and "0001" encodes to "11". "Message" and "encoded message" are assumed to be identical (i.e., a direct map) for simplicity in table 1. This simplification (i.e., message is identical to encoded message) is also made in discussion of FIGS. 2A and 2B; 3A, 3B, and 3C; 4A and 4B; and 5A and 5B. Table lookup or logic circuitry is used in alternate embodiments to map a message into an encoded message.

TABLE 1

| Message | Meaning | Action taken by chip 11 |
| --- | --- | --- |
| 00 | Fatal Error | Do not use data; Terminate operation of electronic system 110 electronic system 110 |
| 01 | Received request from chip 11, but data was corrupt | Retransmit request |
| 10 | Significant problem on chip 10; associated data is suspect | Quarantine chip 10; do not rely on chip 10 for future communication. |
| 11 | Normal Strobe | Latch data in; use the data |

Figure 2A:
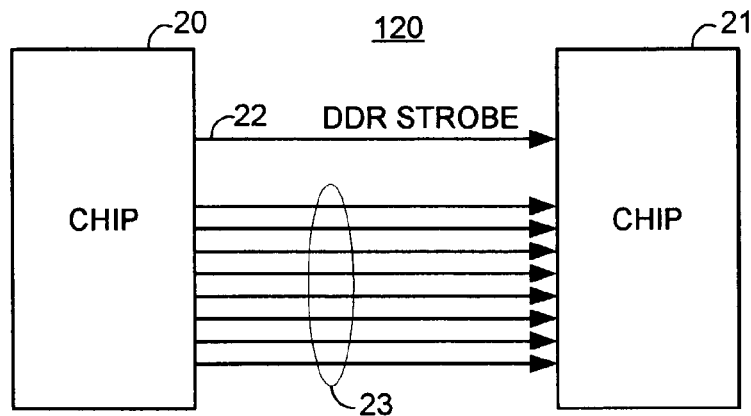
FIG. 2A shows a block diagram of a unidirectional, double data rate (DDR) data bus and an accompanying strobe coupling a first chip and a second chip.

FIG. 2A shows an electronic system 120 comprising a first chip 20 a second chip 21, a signaling bus 23, and a DDR strobe 22. The difference between electronic system 120 and electronic system 110 is that "double data rate" (DDR) transmission is employed in electronic system 120. In DDR, data is normally latched by chip 21 on each transition (i.e., both the rising transition and the falling transition) of DDR strobe 22.

Figure 2B:
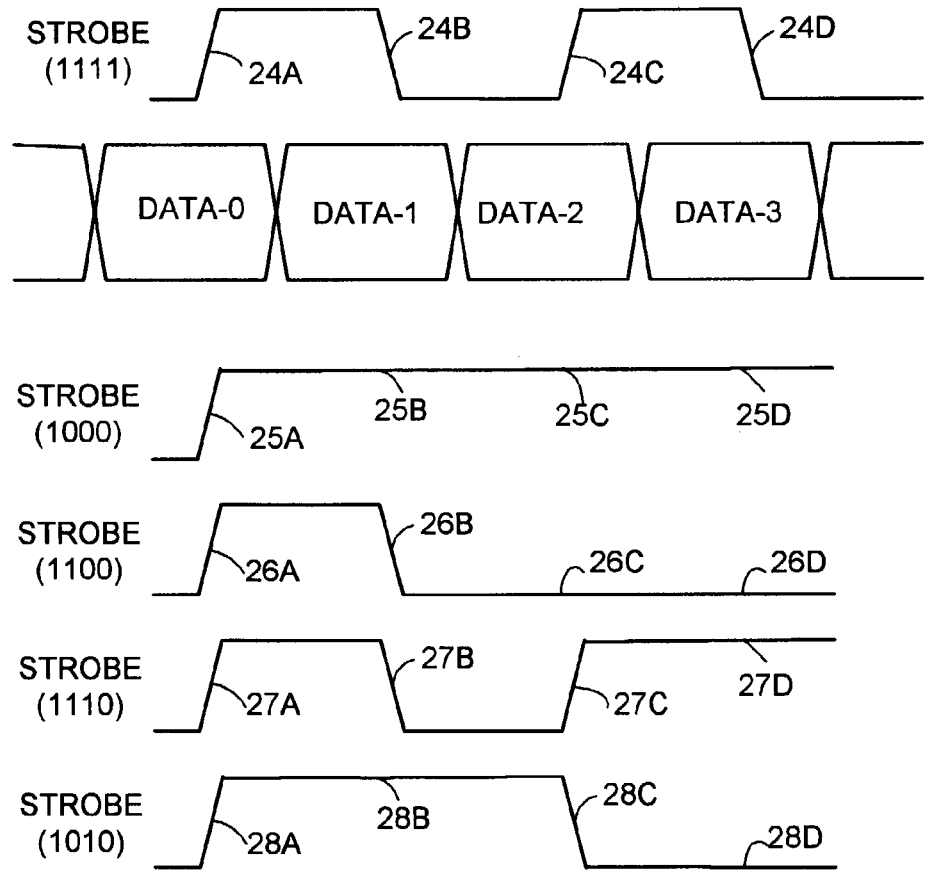
FIG. 2B shows representative waveforms on signals associated with the block diagram of FIG. 2A.

FIG. 2B shows a four-beat signaling transfer of data over signaling bus 23. When the strobe message (normal strobe) is "1111" as shown in FIG. 2B, Data-0, Data-1, Data-2, and Data-3 are latched into chip 21 by transitions 24A, 24B, 24C, and 24D, respectively.

As in the examples of FIG. 1B, FIG. 2B shows several of the encoded messages possible. Since there are four transitions, with each transition either occurring or not occurring, there are 16 possible messages (including the normal "1111" message). Exemplary encodings of "1000", "1100", "1110", and "1010" are shown as waveforms, besides the normal "1111". Chip 21 takes predetermined action, based upon the particular message received, as taught in Table 1 for the simple, two-beat data transfer.

In some embodiments of electronic system 120 (as well as electronic system 110, 130, 140 and 150 of FIGS. 1A, 3A, 4A, and 5A), not all encodings are allowable. For example, in an embodiment, the strobe must be at a low logic level at the start of a number of beats on the signaling bus. In this embodiment, there must be an even number of transitions, since an odd number of transitions would leave the strobe signal at an invalid logic level at the end of the transfer of the beats.

Many data transfers involve far more than the two-beat or four-beat transfers discussed in the examples above, and a huge number of potential messages are contemplated. For example, where a 128-beat data transfer is implemented, each beat strobe with a transition on the associated strobe signal, in an embodiment, a transition means that the associated data beat is valid; a missing transition means that the associated data beat should not be used. The receiving chip (chip 21 in FIG. 2A) then repeats its request for the data in an embodiment; in another embodiment wherein receipt of all data beats is not critical, the receiving chip simply proceeds with the data that was reported as "valid", and discards or does not use the data reported as "not valid" (i.e., did not have an accompanying transition in the expected window).

FIG. 3A shows electronic system 130, comprising chip 30, chip 31, signaling bus 33, and differential strobe 32. As shown, signaling bus 33 is unidirectional, as is differential strobe 32. Differential strobe 32 is a differential signal, further comprising phase 32T (a "true" phase) and phase 32C (a "compliment" phase).

Figure 3B:
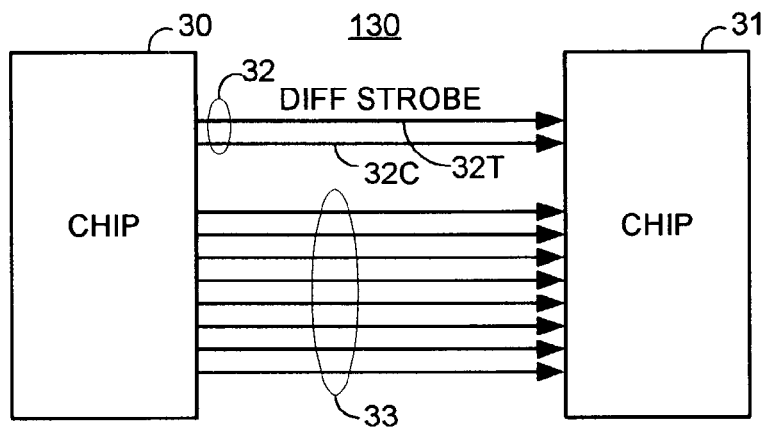
FIG. 3B shows representative waveforms on signals associated with the block diagram of FIG. 3A.
Figure 3B:
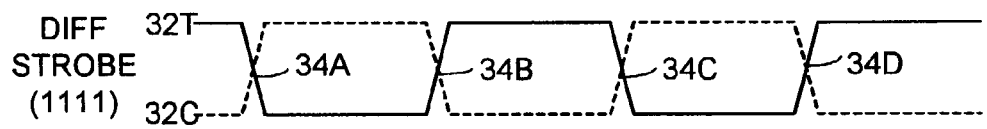
Figure 3B:
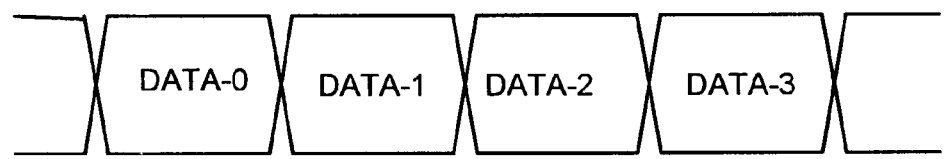
Figure 3B:
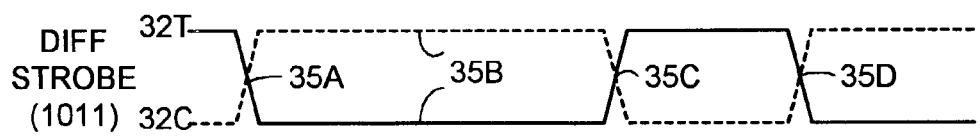

FIG. 3B shows the encoding of messages similarly to that described in electronic system 120 of FIG. 2A. In FIG. 3B, phase 32T and phase 32C always carry the same information, but in a complimentary fashion. Transitions 34A, 34B, 34C, and 34D normally result in Data-0, Data-1, Data-2, and Data-3 being latched into chip 31. The normal message is "1111" (every transition occurs). A alternate message "1011" is shown to be sent as DIFF Strobe (1011) (transition 35A, 35C, and 35D occur, but transition 35B does not occur), with that message being received, decoded, and interpreted in a manner similar to that described in the previous examples, with chip 31 taking a predetermined action, such as, for example, repeating its request for the data, ignoring the data, or termination operation of electronic system 130.

Figure 3C:
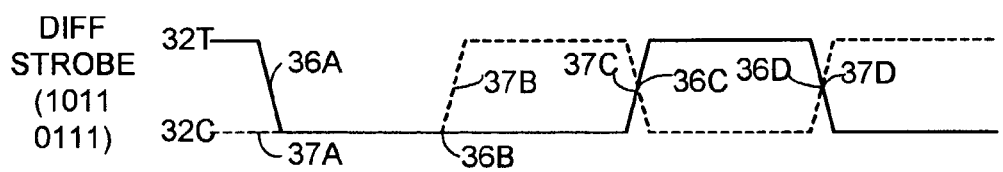
FIG. 3C shows alternative waveforms on signals associated with the block diagram of FIG. 3A, illustrating an alternative embodiment of the invention, using independent signaling on each of the signal conductors of the differential strobe.
Figure 3C:
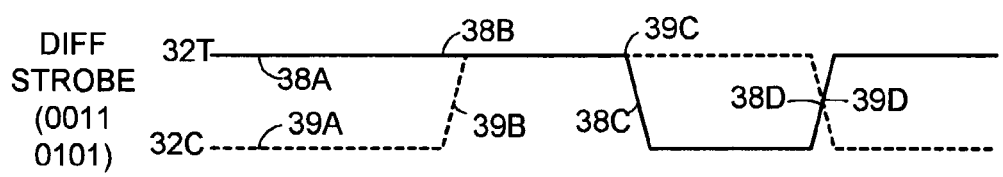

If electrical constraints and tolerances allow, additional messages can be encoded by driving phase 32T and phase 32C independently as shown in FIG. 3C, resulting in a message having twice as many bits. For example, DIFF Strobe (1011 0111) transmits "1011" on phase 32T (transitions 36A, 36C, and 36D occur; transition 36B does not occur), and "0111" on phase 32C (transitions 37B, 37C and 37D occur, but transition 37A does not occur). A further example in FIG. 3C shows DIFF strobe (0011 0101) with exemplary waveforms.

Figure 4A:
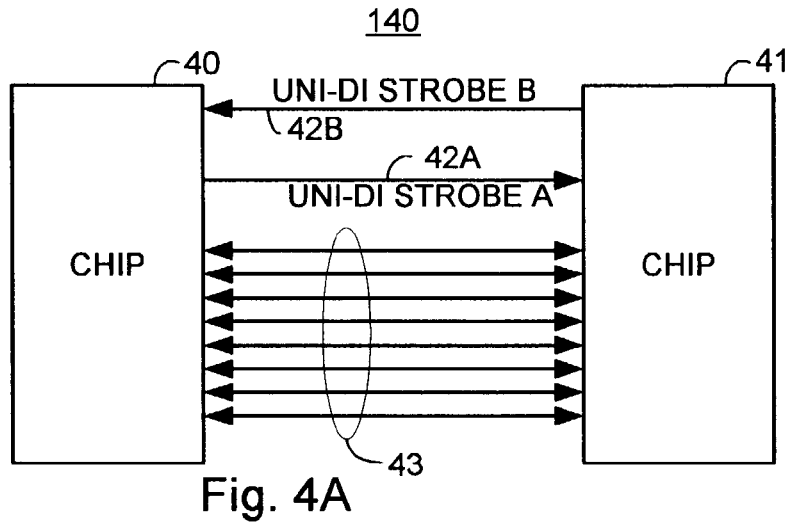
FIG. 4A shows a block diagram of a bidirectional, double data rate data bus with a separate unidirectional strobe for each direction of data transfer, coupling a first chip and a second chip.
Figure 4B:
FIG. 4B shows representative waveforms on signals associated with the block diagram of FIG. 4A.
Figure 4B:
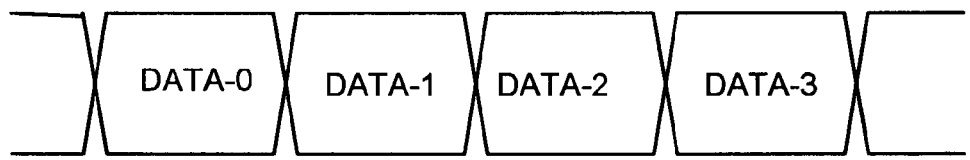
Figure 4B:
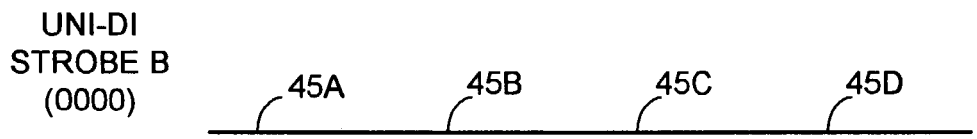
Figure 4B:

FIG. 4A shows electronic system 140, comprising chip 40, chip 41, signaling bus 43, unidirectional strobe A 42A, and unidirectional strobe B 42B. Signaling bus 43 is a bidirectional bus. Typically when two or more chips are coupled together with a bidirectional bus, chips time-multiplex their use of the bidirectional bus. For example, chip 40 drives signaling bus 43 at a time when chip 41 is receiving data. At a later time, chip 41 drives signaling bus and chip 40 receives data. Many protocols are known in the art regarding deciding which chip can drive signaling bus 43 at a particular time. In the exemplary electronic system 140, unidirectional strobe A 42A is normally driven by chip 40 and received by chip 41 to latch data into chip 41 from signaling bus 43. Unidirectional strobe B 42B is normally driven by chip 41 and received by chip 40 to latch data into chip 40 from signaling bus 43. FIG. 1B shows unidirectional strobe A 42A (1111) having transitions 44A, 44B, 44C, and 44D, which normally are used to latch Data-0, Data-1, Data-2, and Data-3 into chip 41. During this transfer, in previous systems, unidirectional strobe B 42B is driven to a particular logic level (i.e., high or low) by chip 41. However, in an embodiment of the present invention, chip 41 leaves unidirectional strobe B 42B in a high impedance state and allows chip 40 to drive unidirectional strobe B 42B. Two exemplary messages unidirectional strobe B "0000" and unidirectional strobe B "0110" are shown as waveforms. Sixteen different messages can be transmitted on unidirectional strobe B 42B in the 4-beat data transfer of the example. As before, the number of messages that can be transferred goes up as more beats are in the data transfer. Unidirectional strobe A 42A can also carry messages, as taught in the discussion of previous electronic systems 110, 120, and 130.

The various examples given above are exemplary only. The present invention contemplates encoding messages on any embodiment of a strobe associated with a signaling bus.

Figure 5A:
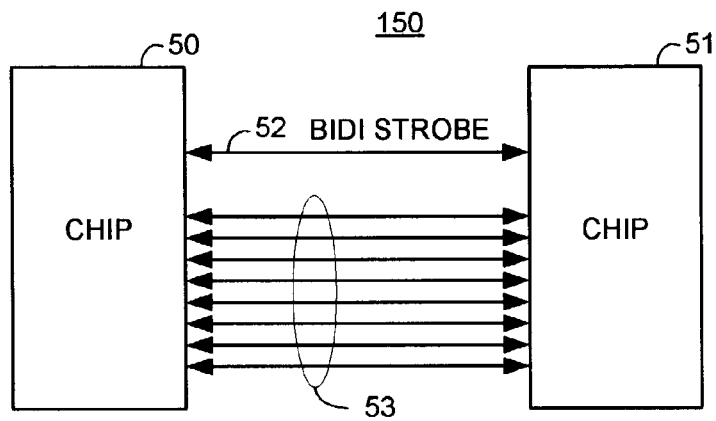
FIG. 5A shows a block diagram of a bidirectional, double data rate, data bus with a single, bidirectional strobe, coupling a first chip and a second chip.

FIG. 5A shows an electronic system 150, comprising chip 50, chip 51, signaling bus 53, and bidirectional strobe 52. Signaling bus 53 is bidirectional, as is bidirectional strobe 52.

Figure 5B:
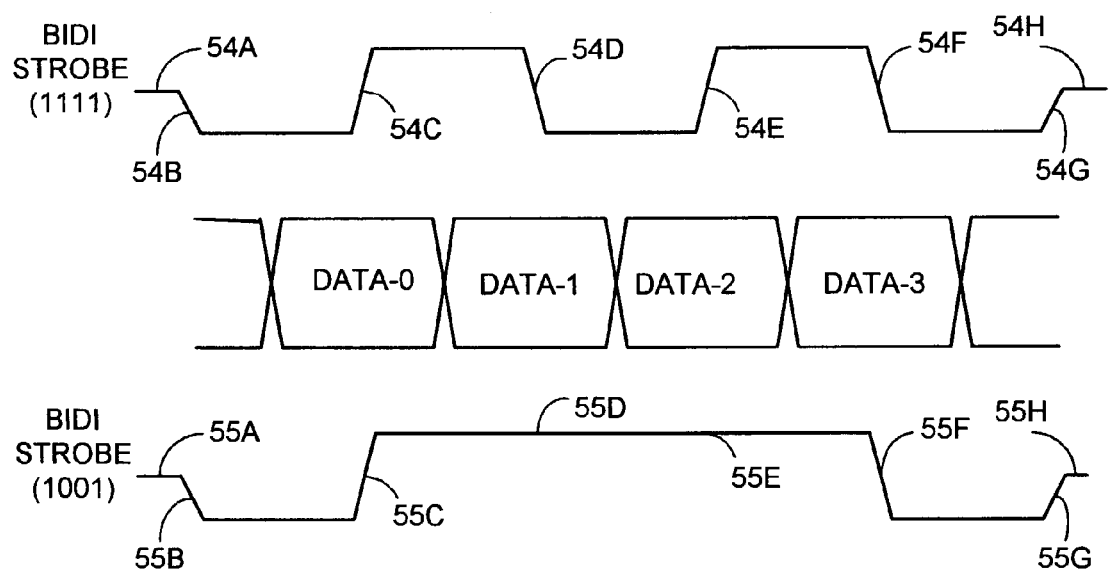
FIG. 5B shows representative waveforms on signals associated with the block diagram of FIG. 5A.

Encoding, transmission, reception, and response of messages are similar to those discussed before, however, as shown in FIG. 5B, a bidirectional strobe typically has to be driven to a known logic level prior to the beginning of data transfer, in order that all transitions that occur are intended to occur, and not simply transitions from where the voltage on the strobe conductor was prior. Often such strobe lines are left in a high impedance condition for some time and may "float" to an unknown logic level, or be at an indeterminate logic level. FIG. 5B shows the bidirectional strobe message "1111" (normal message with a transition for each beat of data on signaling bus 53). Bi-directional strobe 52 has an undetermined logic level 54A, which is driven to a known logic level 54B (i.e., low, in the example) prior to transmission of the message. Transitions then occur as before, allowing chip 51 (assuming data is being sent by chip 50 and is being received by chip 51) to latch data from signaling bus 53 using transitions 54C, 54D, 54E, and 54F to latch in data-0, data-1, data-2, and data-3, respectively. FIG. 5B shows an alternate message BIDI strobe (1001) (i.e., message "1001") being sent (transitions 54C and 55F occur, but transitions 55D and 55E do not occur). Following transmission of the 4-beat data transfer, strobe signal 52 is allowed to return to a high impedance state, as shown as 54H or 55H.

Figure 6:
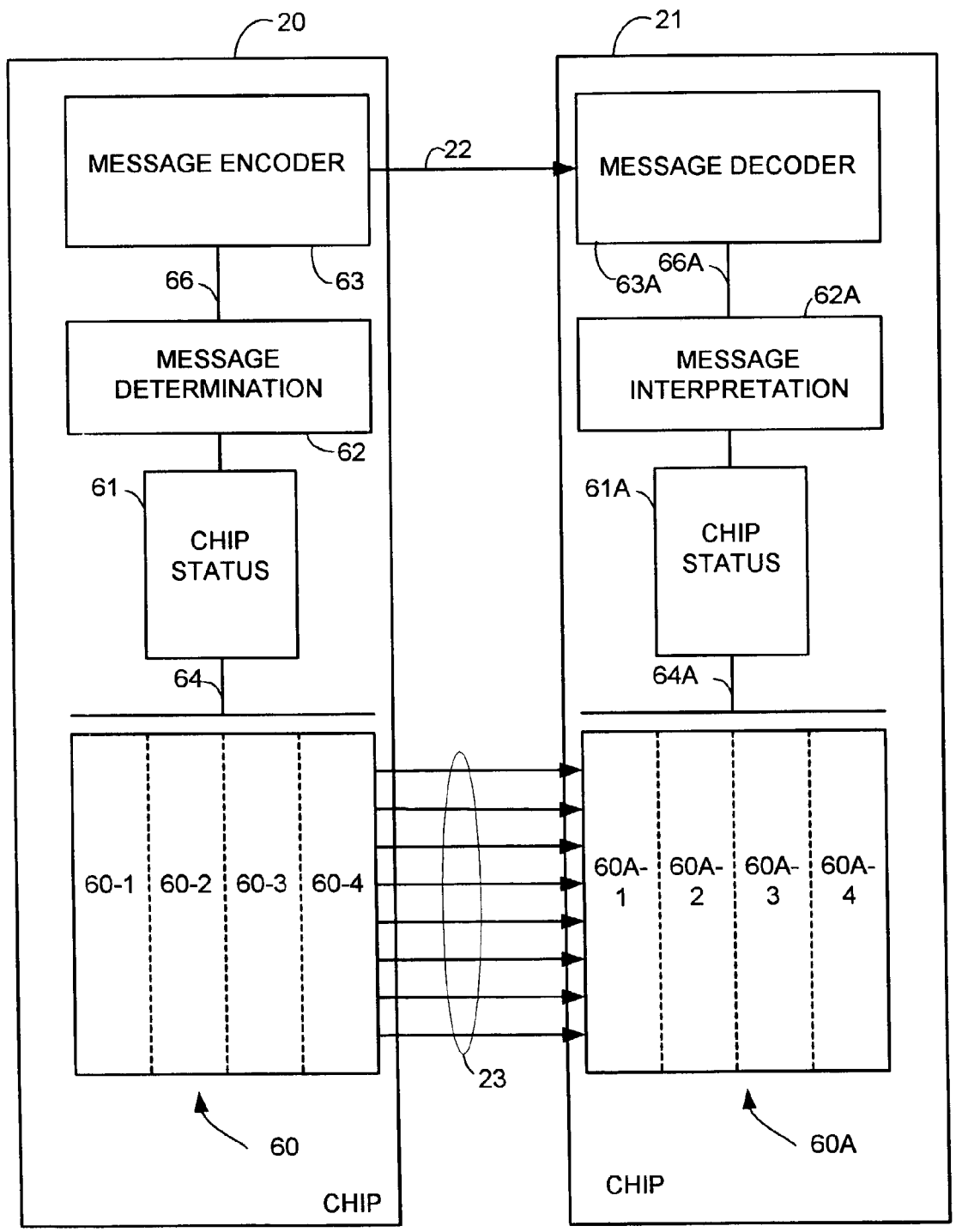
FIG. 6 shows a block diagram of a sending chip having ability to encode messages on a unidirectional strobe signal and a receiving chip having ability to decode and interpret messages on the strobe signal.

FIG. 6 shows a block diagram of an exemplary embodiment of chips 20 and 21. SDR strobe 22 and signaling bus 23 are shown coupling chip 20 and chip 21. This exemplary embodiment assumes a 4-beat data transfer as discussed earlier for electronic system 120, featuring chips 20 and 21.

Chip 20 has data bank 60, further divided into banks 60-1, 60-2, 60-3, and 60-4. Banks 60-1, 60-2, 60-3, and 60-4 are groups of storage elements, such as latches or registers, each with a data width equal to the width of signaling bus 23. For example, if signaling bus 23 can carry 32 signals simultaneously, the widths of banks 60-1, 60-2, 60-3, and 60-4 are each 32 bits. During each beat of transfer, one of banks is driven onto signaling bus 23.

Chip status unit 61 is logic on chip 20 that can report any information relevant to data transfer over signaling bus 23. For example, chip status unit 61, in embodiments, detects errors that have occurred on chip 20 such as thermal problems, data errors too numerous to correct with ECC, unavailability of data to transmit, or one or more errors in data bank 60, or uncertainties regarding prior transmissions received from chip 21. Many chips are self initialized at power up, or are initialized by commands from other chips. Chip status unit 61 in an embodiment verifies proper initialization. Many chips depend on Phase Lock Loop (PLL) lock or Delay Lock Loop (DLL) lock for proper operation. In an embodiment, chip status unit 61 verifies proper PLL lock or DLL lock. Dynamic Random Access Memory chips (DRAMs) depend on periodic refreshes. In an embodiment in which chip 10 is a DRAM chip, chip status unit 61 verifies that a specified refresh interval has not been exceeded. Those skilled in the art will recognize that many conditions on a chip may result in a requirement to communicate a message indicative of that condition to another chip that receives data from the sending chip. The current invention contemplates all such conditions. Chip status unit 61 is also coupled to data bank 60 in order to detect any errors that may exist in banks 60-1, 60-2, 60-3, or 60-4 that causes a condition for which a message must be encoded and sent over SDR strobe 22. Any condition relevant to data transmission over signaling bus 23 is contemplated in the present invention.

Message determination unit 62 receives status information from chip status unit 61 and determines which of a plurality of messages, needs to be transmitted over SDR strobe 22. Examples are "normal", "fatal error", "uncertainty of request" (e.g., a parity error in a prior request, an unsupported request, and similar uncertainties), and "data in bank 60-2" is corrupt." The present invention contemplates any message relevant to data transfer on the associated data bus.

Message encoder 63 receives a message from message determination unit 62 and encodes it for transmission on SDR strobe 22. For example, in an embodiment, message determination unit 62 provides a 16-bit message, where one and only one bit is "active", and encodes that information into a 4-bit encoded message.

Those skilled in the art will understand that the division of function shown in FIG. 6 is only exemplary. For example, in an embodiment, message determination unit 62, is designed with the function of message encoder 63 included.

Chip 21, in FIG. 6 comprises a message decoder 63A, a message interpretation unit 62A, a chip status unit 61A, data bank 60A, and communication 64A coupling chip status unit 61 A to data bank 60A.

Message decoder 63A receives messages transmitted over SDR strobe 22 and decodes the message sent. Message decoder 63A is coupled to message interpretation unit 62A, which determines (e.g., by logic circuits, table look up, or other known technique) what the message is. Message interpretation unit 62A is coupled to chip status unit 61A, which determines a response based on the message received from chip 20. Responses are determined using table lookup (e.g., as in the example of table 1), by logic circuitry, or by any other technique. Responses, as before include, but are not limited to, discarding some or all of the data block received into data bank 60A; re-requesting the data block; and terminating operation of electronic system 120. Chip status unit 61A in an embodiment also considers status information on chip 21 (e.g., temperature, voltage, validity of the data being received) in determining a response, including such information as input to the technique used in a particular embodiment (e.g., table look up). Data bank 60A is a storage area used to receive data transmitted, and, in the embodiment shown, comprises banks 60A-1, 60A-2, 60A-3, and 60A-4, to receive the four beats of data in the data transmission assumed for the illustrated example.

Typically, accurate timing of strobe transitions is critical to latching in data. Although FIG. 6 shows that a strobe transition must go through message decoder 63A, message interpretation unit 62A, and chip status unit 61A prior to arrival at data bank 60A, a preferred embodiment allows the transitions to flow through those units relatively undelayed, with interpretation of non-normal messages (i.e., where the receiving chip must take some action other than simply latching the incoming data) being processed in parallel, and at a somewhat reduced speed. For example, if chip 20 has sent a message that it was uncertain of a prior request from chip 21, any data sent over signaling bus 23 is either suspect or, more likely, is default data (such as "all zeroes"), rather than data needed by chip 21. The units (e.g., message decoder 63A, message interpretation unit 62A, and chip status unit 61A) in chip 21 typically have all or most of the time required to transmit the four beats of data before action must be taken.

The exemplary structure of FIG. 6 illustrates the present invention using chips 20 and 21, signaling bus 23, and SDR strobe 22. Those skilled in the art will understand that the teaching of FIG. 6 also applies to all other electronic systems using unidirectional busses with associated strobe signals.

Figure 7:
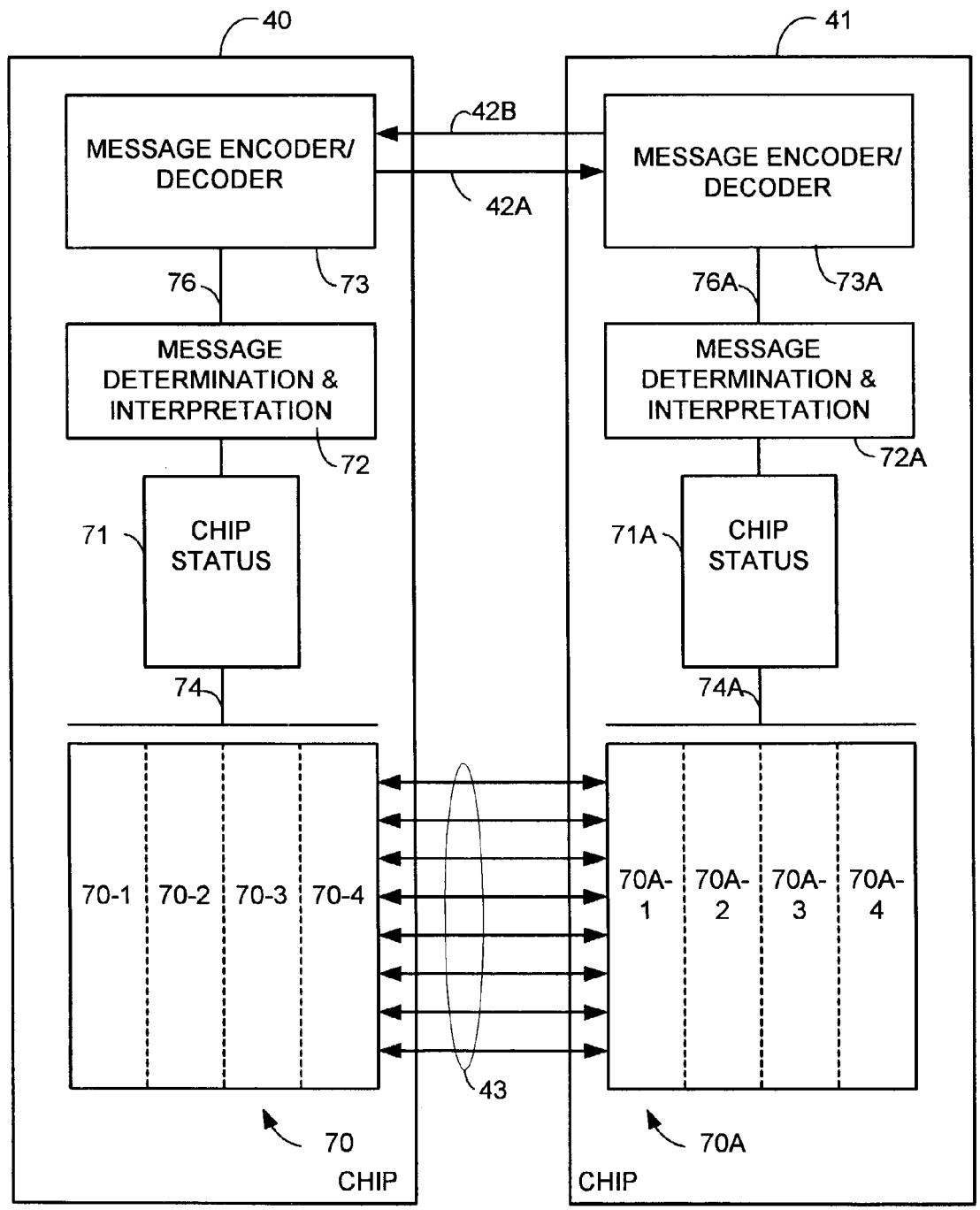
FIG. 7 shows a block diagram of coupled chips having ability to encode messages on one or more strobe signals associated with a bidirectional data bus, and to decode and interpret the messages.

FIG. 7 shows a more detailed block diagram of chips 40 and 41. Signaling bus 43 is bidirectional in this exemplary figure, and two strobe lines are shown; strobe 42A is used by chip 41 to latch data into chip 41; strobe 42B is used by chip 40 to latch data into chip 40. Since either chip can, at a given time be either a driver or receiver, Message encoder/decoders 73 and 73A each must contain the total function described for message encoder unit 63 and message decoder 63A. Message determination unit & interpretation units 72 and 72A each must contain the total function described for message determination unit 62 and message interpretation unit 62A. Chip status units 71 and 71 A must each contain the functions of chip status unit 61 and chip status unit 61 A. Storage banks 70 and 70A must be able to both drive and receive data over bidirectional signaling bus 43. As described earlier, in an embodiment where a message is to be transmitted by a first chip over a strobe signal not being used to strobe data into the first chip, message encoder/decoder units 73 and 73A each must be capable of not actively driving the particular strobe signal so that the message encoder/decoder unit on a second chip does not actively drive the particular strobe when the first chip is driving the strobe. For example, if chip 40 is driving data over bidirectional signaling bus 43, message encoder/decoder 73A must not actively drive strobe 42B at the same time.

Figure 8:
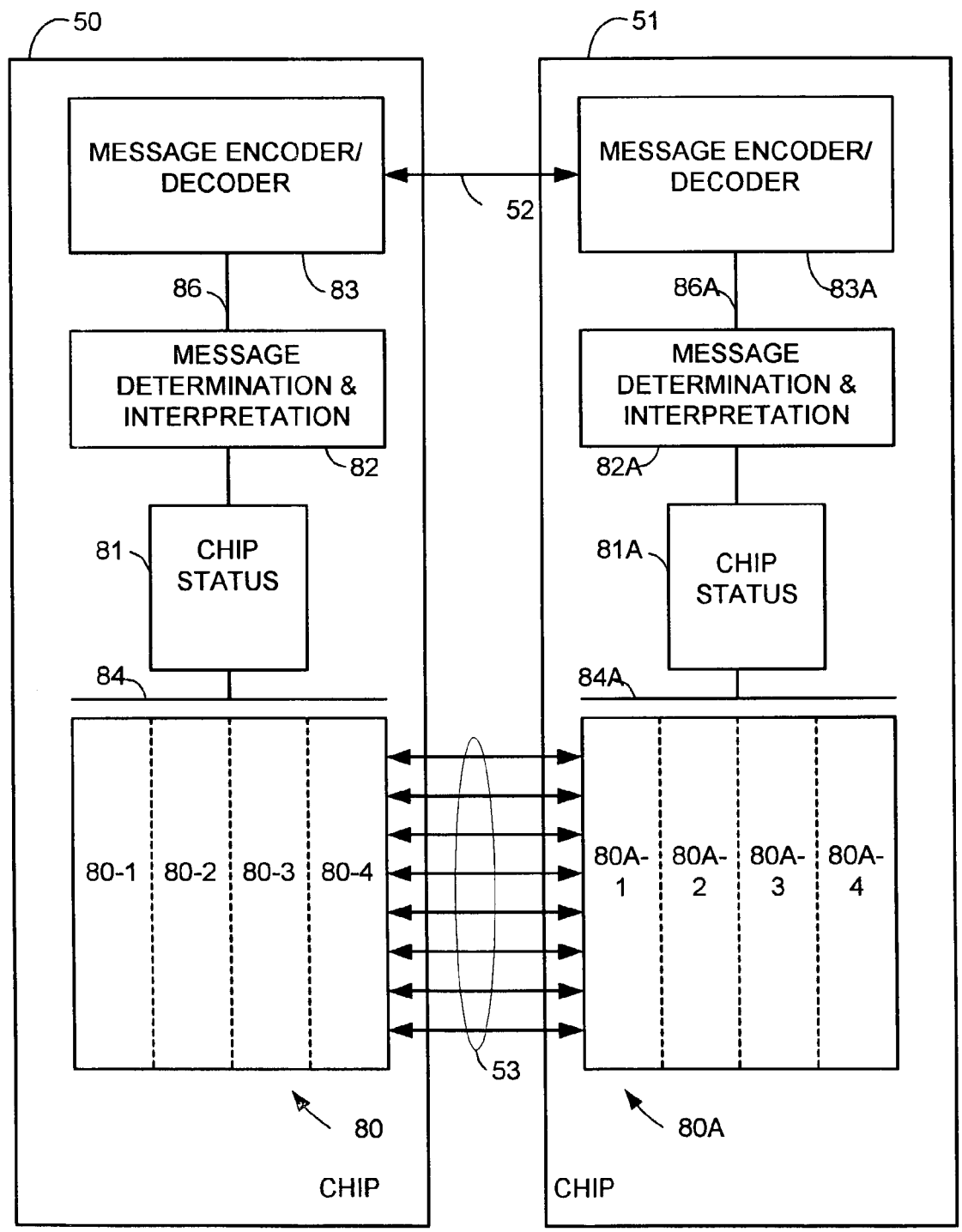
FIG. 8 shows a block diagram of two chips coupled by a bidirectional signaling bus and a bidirectional strobe signal; each chip having ability to encode and transmit a message via the bidirectional strobe signal and ability to receive, decode and interpret the message.

FIG. 8 shows a more detailed block diagram of chip 50 and chip 51. Signaling bus 53 is bidirectional, and strobe 52 is also bidirectional. Since data can be transmitted in either direction of bidirectional signaling bus 53, message encoder/decoder 83 and 83A must each have the combined function of message encoder 63 and message decoder 63A. Message determination unit & interpretation units 82 and 82A must each have the combined function of message determination unit 62 and message interpretation unit 62A. Chip status units 81 and 81A must each have the combined function of chip status unit 61 and chip status unit 61A. Storage 80 and 80A must both be able to store data from and send data to bidirectional bus 53. When chip 50 is sending data to chip 51 over signaling bus 53, chip 51 must not be driving signaling bus 53 at the same time. Similarly, strobe 52 is bidirectional. When chip 50 is sending a message on strobe 52, chip 51 must not be driving strobe 52 at the same time.

Those skilled in the art understand that, in another embodiment, using recent advances in signal driving and receiving, some electronic systems have signaling busses and strobe signals that are capable of simultaneous bidirectional data transmission. In an embodiment using such techniques in chips 50 and 51, chip 50 could simultaneously drive data to chip 51 on signaling bus 53 and receive data from chip 51 on signaling bus 53. Strobe 52, in such embodiment would transfer encoded message simultaneously from chip 51 to chip 52 and from chip 52 to chip 51.

Figure 9:
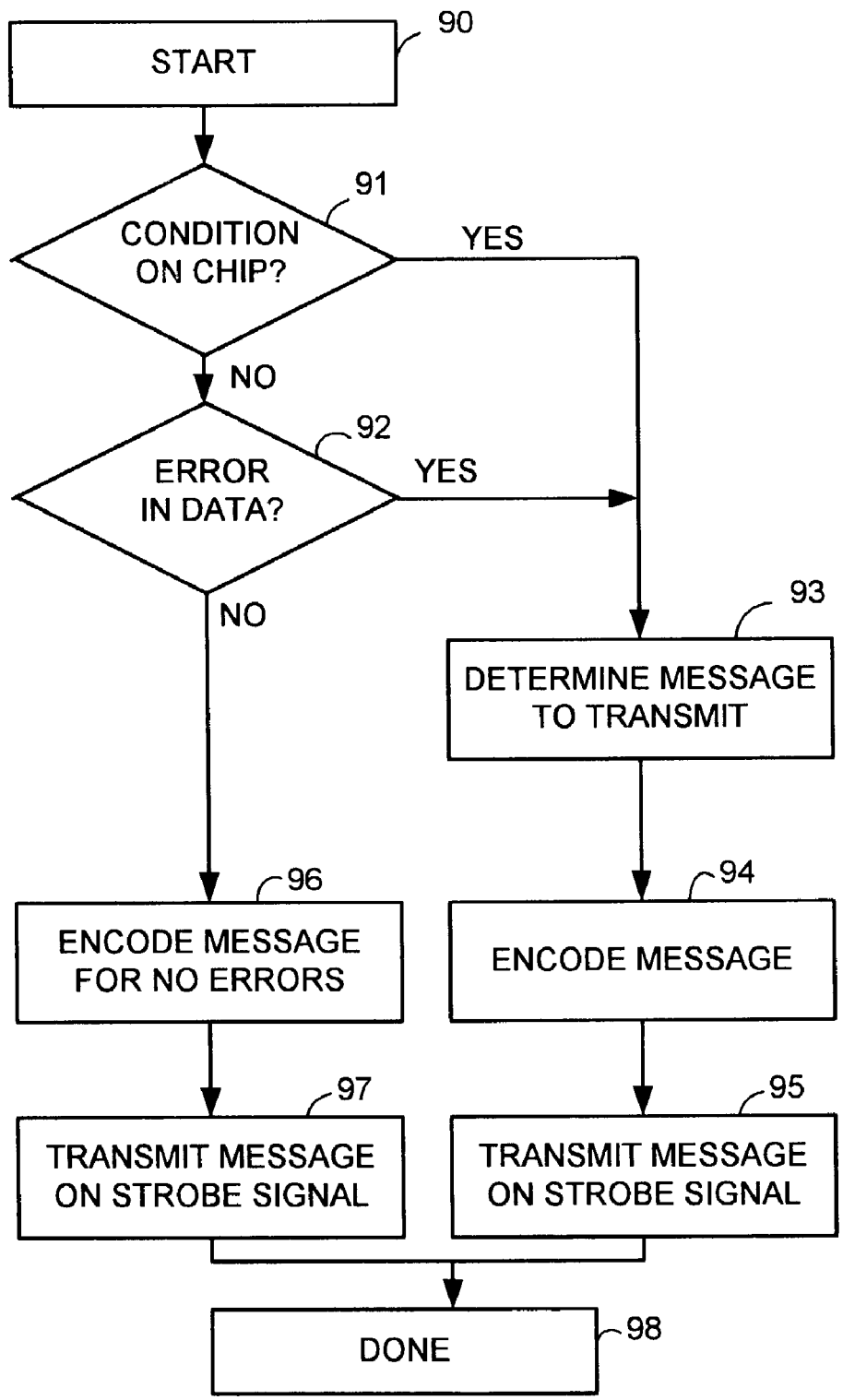
FIG. 9 shows a flow chart of a preferred method embodiment of this invention.

FIG. 9 is a flowchart illustrating a preferred method embodiment of the present invention.

Step 90 begins the method used to encode and transmit information messages from a first chip to a second chip that contain information via a strobe signal that is relevant to data being transferred over an associated signaling bus.

In step 91, if any condition (errors, information, or problems) relevant to transmission of a block of data is found on the first chip, control passes to step 93. Such errors, information, or problems include, but are not limited to, detection of thermal problems; detection of voltage problems; one or more errors in the block of data; uncertainty of validity of data in the block of data; one or more errors associated with portions of the first chip that might jeopardize validity of the data to be sent; lack of PLL lock, lack of DLL lock; improper self or external chip initialization; failure to meet refresh timing specifications; unavailability of data to transmit to the second chip; and uncertainty regarding a prior request made from the second chip.

In step 92, data to be transmitted is examined for errors. Although any error (e.g., errors correctable by ECC) is of interest, errors that cannot be corrected are of particular interest. If errors are found, control passes to step 93.

If no errors have been found in step 91 or 92, control flows to step 96, which encodes a message to be sent on a strobe signal as an encoded message. This encoded message simply contains the transitions needed by the second chip to latch transmitted data into the second chip. Control then flows to step 97, where the encoded message is transmitted on the strobe signal.

Step 93 determines a message to transmit over the strobe signal. Step 93 was reached after determination of a condition on the first chip that needs to be sent to the second chip. Step 93 determines a message, using logic circuitry, table lookup, or other technique to select a particular message among a number of predetermined messages.

Step 94 encodes the message determined by step 93 into an encoded message. A table lookup is used to encode the message into the encoded message in one embodiment. In a second embodiment, logic circuitry is used to encode the message into the encoded message. In a third embodiment, the message is used directly as the encoded message. Step 95 transmits the encoded message on the strobe signal.

Step 98 is the end of the method.

While the foregoing is directed to embodiments of the present invention, other and further embodiments of the invention may be devised without departing from the basic scope thereof, and the scope thereof is determined by the claims that follow.

What is claimed is:

1. A method for communicating a message from a first component to a second component in an electronic system, the method comprising the steps of:
   determining, on the first component, the message that must be communicated to the second component relevant to a block of data transmitted over a signaling bus; and
   transmitting an encoded message respondent to the message from the first component to the second component via a strobe signal associated with the signaling bus, the strobe signal normally providing the second component signal transitions used by the second component to latch data from the signaling bus.

2. The method of claim 1, further comprising the steps of:
   partitioning the block of data on the first component into N sub-blocks, each sub-block being of same width as the signaling bus; and
   sequentially driving, by the first component, each sub-block onto the signaling bus, each sequential drive of a sub-block being a beat of data on the signaling bus.

3. The method of claim 2, the step of transmitting the encoded message via the strobe signal further comprising the steps of:
   determining a message to be transmitted, responsive to a condition on the first component, relevant to the block of data, that must be communicated; and
   encoding the message into the encoded message.

4. The method of claim 3, further comprising the steps of:
   transmitting a first encoded message comprising a number of transitions on the strobe signal needed by the second component to latch all beats of data at the second component, and no further information is required; and
   transmitting a second encoded message differing from the first encoded message if additional information is required.

5. The method of claim 4, wherein the additional information comprises information about one or more of the following conditions: thermal information measured on the first component; voltage information measured on the first component; at least one error in the block of data; uncertainty about validity of data in the block of data; unavailability of data in the block of data; uncertainty regarding a prior request made by the second component; loss of phase lock loop lock; loss of delay lock loop lock; violation of refresh timing specification; improper self initialization; improper external initialization; and uncertainty of a prior request from the second component.

6. The method of claim 3, the step of determining the message further comprising the step of using a look up table to select one message from a plurality of messages, respondent to the condition on the first component.

7. The method of claim 3, the step of determining the message further comprising the step of using logic circuitry to select one message from a plurality of messages, respondent to the condition on the first component.

8. The method of claim 3, the step of encoding the message into the encoded message comprising the step of using a lookup table.

9. The method of claim 3, the step of encoding the message into the encoded message comprising the step of using logic circuits.

10. The method of claim 3, the step of encoding the message into the encoded message comprising directly using the message as the encoded message.

11. The method of claim 1, wherein the step of transmitting an encoded message further comprises transmitting the encoded message via a strobe signal chosen from the group consisting of a unidirectional strobe signal, a bidirectional strobe signal, a differential unidirectional strobe signal, differential bidirectional strobe signal, and a pair of unidirectional strobe signals.

12. An electronic system comprising:
   A first component;
   a second component coupled to the first component by a signaling bus and at least one strobe signal conductor associated with the signaling bus;
   the first component having the ability to encode a first message and transmit the first message to the second component via the at least one associated strobe signal conductor;
   The second component having the ability to receive the first message, decode the first message, and use the first message to latch data transmitted on the signaling bus;
   the first component having the ability to encode a second message respondent to a condition relevant to a block of data to be transmitted on the signaling bus from the first component and transmit the second message to the second component via the at least one associated strobe signal conductor; and
   the second component having the ability to receive the second message, decode the second message, and use the second message to take action other than to latch in data on the signaling bus.

13. The electronic system of claim 12, the first component further comprising:
- a first chip status unit in the first component suitable to detect the condition relevant to data transmitted from the first component;
- a message determination unit in the first component suitable to select a particular message from a plurality of predetermined messages respondent to input from the first chip status unit; and
- a message encoder in the first component suitable to encode the particular message into an encoded message and transmit the encoded message via the at least one associated strobe signal conductor.

14. The electronic system of claim 13, the first chip status unit capable of detecting a condition chosen from the group consisting of:
- temperature measurement information on the first component;
- at least one error in a block of data to be transmitted from the first component to the second component over the signaling bus;
- uncertainty of validity of data in the block of data to be transmitted from the first component to the second component;
- unavailability of data in the block of data to be transmitted;
- loss of lock in a phase lock loop;
- loss of lock in a delay lock loop;
- improper self-initialization of the first component;
- improper external initialization of the first component;
- violation of refresh timing specification;
- uncertainty regarding a prior request transmitted from the second component; and
- information about voltage measured on the first component.

15. The electronic system of claim 13, the message determination unit further comprising a table look up to select the particular message from the plurality of messages respondent to input from the chip status unit.

16. The electronic system of claim 13, the message determination unit further comprising logic circuitry to select the particular message from the plurality of messages respondent to input from the chip status unit.

17. The electronic system of claim 13, the message encoder comprising logic circuits suitable to encode and transmit the particular message via the at least one associated strobe signal conductor.

18. The electronic system of claim 13, the message encoder comprising a look up table suitable to encode the particular message.

19. The electronic system of claim 12, the second component further comprising:
- a message decoder in the second component suitable to receive an encoded message transmitted from the first component on the at least one associated strobe signal conductor and produce a decoded message;
- a message interpretation unit in the second component suitable to select the first message and the second message from a plurality of messages respondent to the decoded message; and
- a second chip status unit in the second component suitable to perform actions respondent to the first and second messages.

20. The electronic system of claim 19, the second chip status unit capable of performing the action of retransmitting a prior request to the first component, responsive to the second message.

21. The electronic system of claim 19, the second chip status unit capable of performing the action of causing a portion of a block of data received from the first component to be not used, responsive to the second message.

22. The electronic system of claim 19, the second chip status unit capable of performing the action of terminating operation of the electronic system, responsive to the second message.

23. The electronic system of claim 19, the second chip status unit including a condition on the second chip as a determinant of the action.

24. The electronic system of claim 12, wherein the signaling bus is bidirectional.

25. The electronic system of claim 12, wherein the at least one strobe signal conductor is bidirectional.

* * * * *